April 3, 1928.  
G. FLINTERMANN  
1,664,878  
BEARING  
Filed Aug. 3, 1925  
3 Sheets-Sheet 2
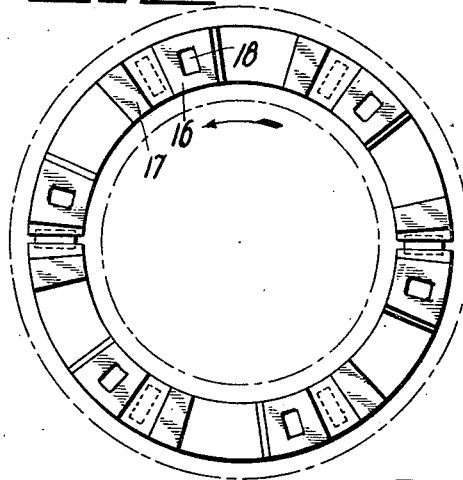
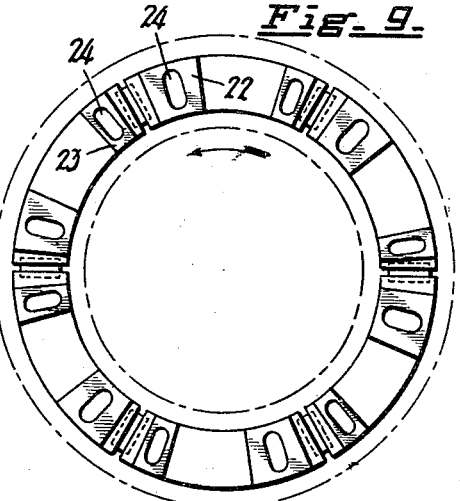
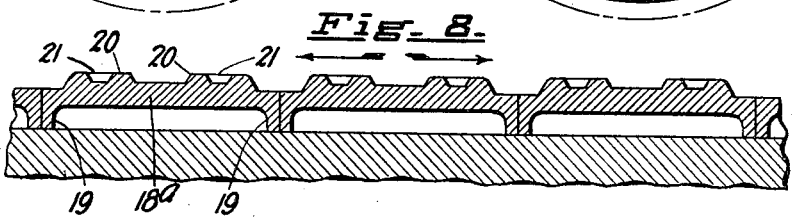
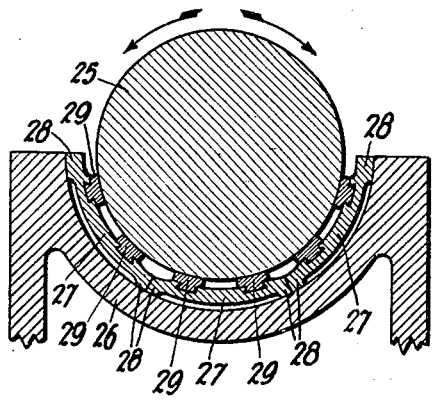
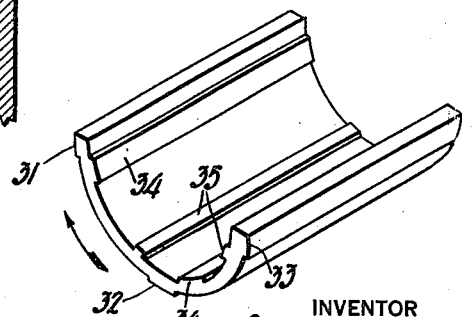
INVENTOR  
Gerhard Flintermann  
BY  
Louis L. Ansart  
his ATTORNEY April 3, 1928.
G. FLINTERMANN
1,664,878
BEARING
Filed Aug. 3, 1925
3 Sheets-Sheet 3
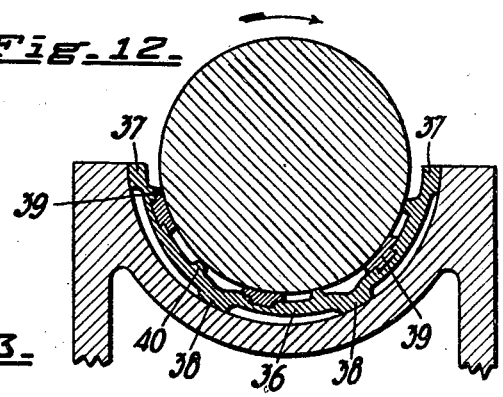
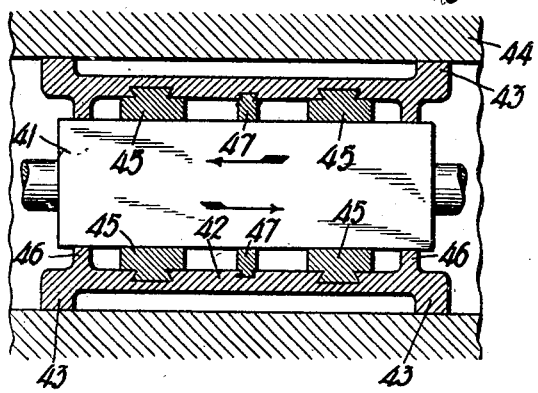
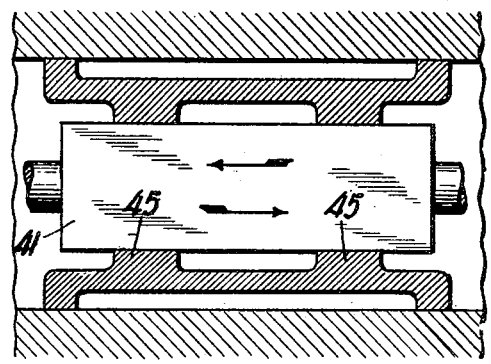
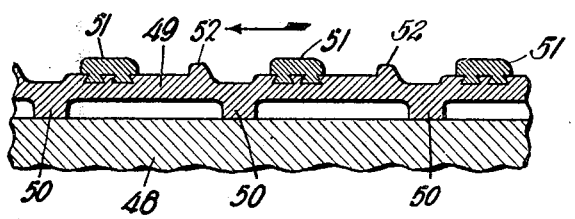
INVENTOR
Gerhard Flintermann
BY
Louis L. Ansart
his ATTORNEY Patented Apr. 3, 1928.

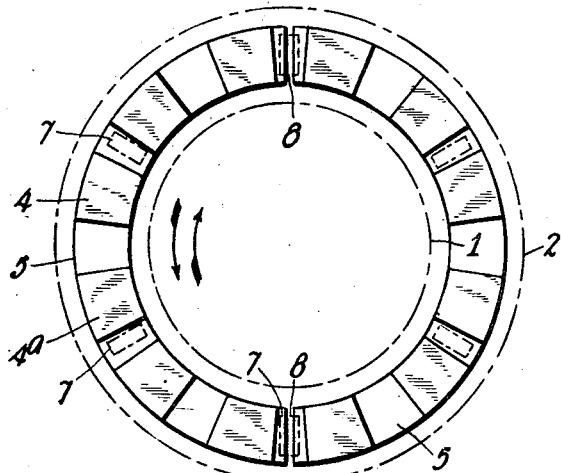
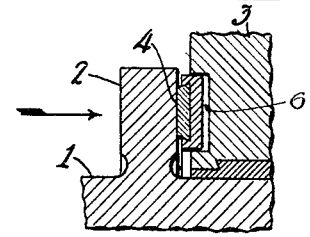
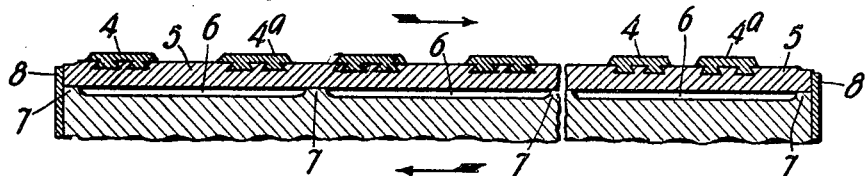
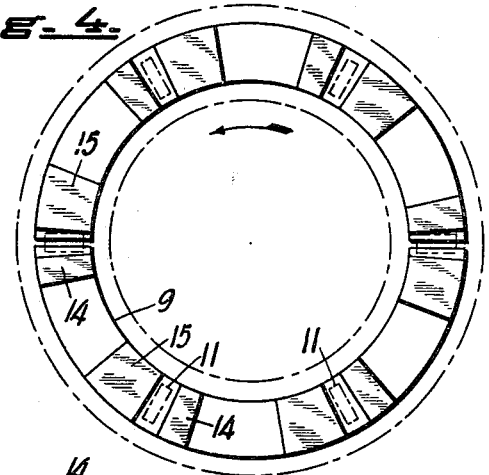
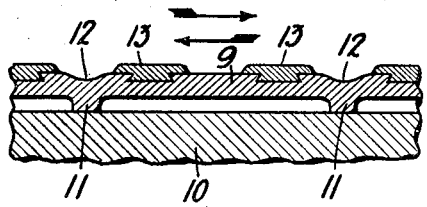
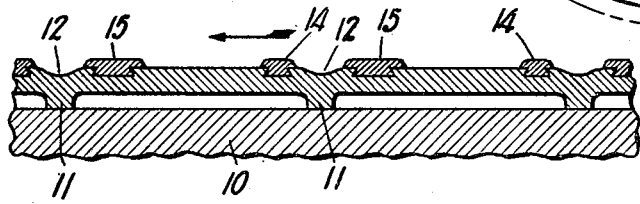

1,664,878

UNITED STATES PATENT OFFICE.

GERHARD FLINTERMANN, OF ORANGE, NEW JERSEY.

BEARING.

Application filed August 3, 1925. Serial No. 47,772.

This invention relates to the construction of bearings such as journal bearings, thrust bearings and slide bearings and cross head bearings. The direction of rotation in the journal and thrust bearings may be in either direction, the cross head bearings functioning for either a backward or a forward direction of movement of the cross heads as is characteristic of these bearings.

The invention provides a bearing having a minimum amount of bearing surface, thereby increasing the efficiency as the friction losses are reduced, and in which the lubrication is improved by the constant supply of fresh oil to the active pads.

Another object is to provide a bearing acted upon by the rotating or moving member to provide, in either direction of movement, wedge-like shaped bodies of oil at the active pads and to provide at the inactive pads enough lubrication to prevent undue friction.

This invention, according to a preferred form thereof, has two separate, projecting pads on a member extending between two end supports; one an active pad and the other a passive pad for the purpose of providing a wedge shape lubricating pressure passage at the active pad and for the interruption of the oil flow between the two active pads by the provision of the passive pad or projecting sealing part. In case of rotation in either direction this projecting part, the passive pad, also forms a pad, preferably symmetrically arranged between the end supports so that either one, depending on the direction of rotation, acts as active or passive pad.

By providing the second pad, the oil pockets are divided into fresh oil spaces in front of the functioning, active pad and an exhaust oil space is provided behind the said functioning, active pad.

The inactive pad provides a certain amount of lubrication, regardless of the direction of rotation; the oil film is, of course, not as effective as the oil wedge obtained when the pad is acting actively on account of the change of rotation and forming an oil shaped wedge.

In case of rotation in one direction only, the passive pad may be made smaller; in certain cases the projecting, inactive pad may even only form a narrow strip to provide means for the interruption of the oil flow and thereby preventing the exhausted oil from the active pad mixing directly with the fresh oil; this allows, by means of said interrupted flow of exhausted oil, that the exhausted oil flows off and fresh oil is available in the next space, immediately in front of the active pad.

When the rotation is in one direction only the inactive pad may be slightly lower than the active pad; this brings about the interruption of the exhausted oil flow as it is not necessary to have a tight seal to bring about this function.

In a bearing of this type it is possible to reduce the projecting pad surfaces, thereby cutting down the friction to a minimum and at the same time carry a greater unit load per square inch; this saves in lubrication, reduces friction losses and increases the efficiency and reliability.

The bearings may be cast, stamped, pressed, drawn, machined or forged from any suitable material. The projecting surfaces may be made of babbitt or other suitable material, and in certain cases, for instance, in a bushing the projecting pads may be integral with the rest of the bearing.

The active pad may be provided with a relatively large oil pocket between the entering and the leaving edge of the pad but of course the oil pocket is closed all around to prevent mimimum leakage into the inactive space; by provision of such an oil pocket in the projecting active pads the active wedge shape pressure and lubricating passage is interrupted by said oil pocket of relatively large size forming a precompression zone between the inward edge of said pad and oil pocket and an end compression zone behind said oil pocket and the leaving edge. The oil pocket between the pre and the end compression zone forms an oil storage of relatively high internal pressure and preferably of large size; this oil storage of high internal pressure in the active pad improves the function of lubrication and also acts as a supporting means and as an oil reserve; it reduces the area of the friction surface. This oil reserve is of course closely surrounded by the said pad and the active surface of same on which the oil wedge functions, thus sealing the pocket and preventing undue leakage but at the same time the suction of the rotating member and the friction of same draws out the necessary oil needed for the formation of the oil wedge in the end compression area. The internal pressure of the oil pocket of the active pad forces the oil into the end area. In certain cases, it may be advantageous to feed the oil direct, as well, into the oil pockets of the active and the inactive pads. In case of bearings used for rotation in either direction oil pockets may be provided in both active and passive pads. In case of rotation in one direction such oil pockets may even be provided in the passive pads to form a certain oil reserve; the oil reserve in these pads increases the reliability and is particularly important in case of emergency.

The storage oil at all times available in these oil pockets tends to increase the margin of safety in operation and there is always a certain amount of oil available due to this convenient storage and the self feeding of oil. In starting the bearing surfaces have at all times some oil coveniently near where it is immediately available and thus reducing to a minimum any danger of seizing or freezing. The oil flow interrupting means, the inactive pads, made it possible to have more bearing pads within certain dimensions than would otherwise be possible and at the same time not to alter unduly, during operation the viscosity of the oil; it makes it unnecessary to have relatively large spaces between the end supports so as to prevent the exhaust oil from flowing and mixing too quickly with oil entering the next pad which is the case with no interrupting means between the active pads.

Other lubricants than oil may be used, including grease.

Other objects and advantages will hereinafter appear.

The accompanying drawings illustrate the invention as applied to a number of different types of bearings.

In the drawings:

Figure 1 is a top view of an elastic stationary bearing ring and pads arranged in a circle for movement of rotation in either direction.

Figure 2 is a partial longitudinal section through a thrust bearing.

Figure 3 is a circumferential section cut through a stationary bearing part for movement in either direction.

Figure 3ª is a modification of the form shown in Figure 3 and shows the pads located near the center.

Figure 4 is a top view showing an elastic stationary bearing ring and pads in a circle, the pads arranged to allow movement in one direction only.

Figure 5 is a circumferential section through a stationary bearing part for movement in either direction.

Figure 6 is a circumferential section through a stationary bearing part, for movement in one direction only.

Figure 7 is a top view showing an elastic stationary bearing ring and pads arranged in a circle and have the oil pockets in the active pads only and narrow interrupting pads allowing movement in one direction only.

Figure 8 is a circumferential section through a stationary bearing, both pads having oil storage pockets for movement of rotation in either direction.

Figure 9 is a top view showing the elastic stationary bearing plates and pads arranged in a circle; active pads having relatively large pockets in the active pads and narrow pockets in the inactive pads; the movement of rotation being in one direction.

Figure 10 is a transverse section of one form of journal bearing having the projecting pads not integral and arranged for either direction of rotation.

Figure 11 is a detail perspective view of a bearing bushing or element used for rotation in one direction only; the plates being tapered.

Figure 12 is a modification, transverse section, having pads arranged for rotation in one direction only; the plates being tapered.

Figure 13 shows the invention applied to a slide bearing for movement in either direction and with narrow pads at ends and center.

Figure 14 is similar to Figure 13 but with the narrow pads omitted at the ends and center.

Figure 15 shows a circumferential section through a stationary bearing part having the inactive pads slightly lower than the active pads.

As illustrated in Figures 1, 2 and 3 a rotary member 1 such as a shaft, is held against longitudinal movement in the direction of the arrow (Fig. 2) by means including an annular member 2 fixed on the rotary member 1 and from which such pressure is transmitted through intermediate elements to a stationary member 3. Preferably the annular member is substantially rectangular in section and is integral with the rotary member 1.

The thrust indicated by the arrow on Fig. 2 is transmitted from the member 2 to projecting pads 4 and 4ª of suitable material such as Babbitt metal carried by stationary elastic or resilient plates 5 arranged around an annular groove 6 in the stationary member and supported at their ends and intermediate points by lugs or ribs 7.

The bearings shown in Figs. 1, 3 and 3ª are adapted for use in either direction of movement of the moving member as indicated by the arrows on Figs. 1 and 3. When the rotation is in the direction of the upper arrow in Fig. 3, the pads 4ª are active and the pads 4 inactive; and, when the rotation is in the direction of the lower arrow, the pads 4 are active and the pads 4ª inactive. The two plates 5 are held against rotation by lugs 8 projecting upwardly therebetween.

In the bearing construction shown in Fig. 5, a resilient plate 9 is supported on a stationary member 10 by lugs 11 and is provided with depressions 12 to supply additional space for exhausted oil. In this form the pads 13 are of equal size and the bearing is adapted for rotation in either direction.

Figs. 4 and 6 show an arrangement adapted for use when the rotation is in one direction only, provision being made of inactive pads 14 relatively narrow with respect to the active pads 15.

In the bearing shown in Fig. 7, there are active pads 16 and inactive pads 17, as indicated by the single arrow and the pads 16 are larger than the pads 17 and have oil pockets 18 therein. In the form shown in Fig. 8, there is an increased number of plates designated by 18ª and each of these plates is provided with downwardly extending integral lugs 19 and integral pads 20, each furnished with a pocket 21. This bearing is designed for either direction of rotation. Fig. 9 shows a modified form of the structure shown in Fig. 7 adapted for one direction of rotation and having wide active pads 22 and narrow inactive pads 23, all of such pads having oil pockets 24.

The invention may also be applied to journal bearings as illustrated in Figs. 10, 11 and 12. Fig. 10 shows a shaft 25 resting in a half bearing comprising a stationary part 26 in which are arranged three resilient sections 27 each formed with supports 28 and pads 29, the arrangement of the parts being such as to permit rotation in either direction. Fig. 11 shows a unitary resilient member for a half bushing, provided with three supports 31, 32 and 33, two active pads 34 and two passive pads 35. According to Fig. 12, there is a single resilient bearing member 36 with two end supports 37 and two intermediate supports 38. This form of bearing member is designed for rotation in one direction only and the member is provided with one active pad 39 and one passive pad 40 in each interval between supports, each passive pad 40 being integral with the support 36, which is shaped to form tapered clearances.

Applications of the invention to slide bearings are illustrated in Figs. 13 and 14. In Fig 13, a slide 41 is mounted between resilient plates 42 supported at their ends by lugs 43 engaging stationary parts 44. The plates 42 carry main bearing pads 45 and smaller end pads 46 and intermediate pads 47. The form illustrated in Fig. 14 is similar to that of Fig. 13 but the narrow pads are omitted.

Fig. 15 shows a bearing having a stationary member 48, a resilient plate 49, supports 50, active pads 51 and inactive pads 52 which are lower than the active pads.

It should be understood that each inactive pad provides also a certain amount of lubrication, regardless of the direction of rotation; the oil film is, of course, not as effective as the oil wedge obtained when the pad is acting actively on account of change of rotation and forming an oil wedge. This oil film in the passive pad is subject to a suction action due to the rotation of the rotating member; this function distinguishes, of course, from the function in the active pad because in the latter the oil film is subject to compression which compression increases rapidly from the entering edge towards the leaving edge of the pads due to rotation of the rotating member and the function of the certain novel features of the present structure. If the rotation occurs only in one direction, the main function of the inactive pad is to form interruption means which applies also in cases of rotation in either direction.

It should be understood that while preferred forms of the invention have been disclosed, these forms are merely illustrative of the invention and that modifications and variations may be made in the arrangement and construction of the parts without departing from the spirit of the invention.

Having thus described my invention, I claim:

1. A bearing for moving members comprising a bearing element supported at at least two points spaced apart in the direction of movement of the moving member to provide a yielding portion between the points of support, said yielding portion having a pair of projections extending toward the surface of the moving member both of which are located wholly between the points of support, said projections being rigidly carried relative to said yielding portion and adapted to yield with said yielding portion and partake of its flexure, and said projections being located on opposite sides of the point of maximum deflection of said yielding portion.

2. A bearing in accordance with claim 1 in which one of said projections is shorter than the other measured in the direction of movement of the moving member.

3. A bearing in accordance with claim 1 in which at least one of said projections comprises a pad of bearing metal.

4. A bearing for moving members comprising a bearing element supported at its forward and rear ends to provide an intervening yielding portion, said yielding portion having a pair of projections extending toward the surface of the moving member and both of which are located wholly between the points of support, said projections being rigidly carried relative to said yielding portion and adapted to yield said yielding portion and partake of its flexure, and said projections being located on opposite sides of the point of maximum deflection of said yielding portion for the purpose described.

5. A bearing for moving members comprising a bearing element supported at at least two points spaced apart in the direction of movement of the moving member to provide a yielding portion between the points of support, said yielding portion having a pair of projections the surfaces of which are adapted to abut against the surface of the moving member, each of said projections being rigidly carried relative to said yielding portion and adapted to yield with said yielding portion and partake of its flexure so as to assume the same inclination as that part of the yielding portion which carries it and said projections being positioned on said yielding portion so that the extreme end of each projection does not extend beyond the corresponding point of support and also being positioned on said yielding portion so that when said portion yields the surfaces of said projections are inclined in opposite directions.

6. A journal bearing comprising a rotary cylindrical member, a bearing bushing section supported at at least two points spaced apart in the direction of rotation of said rotary member to provide a yielding portion between the points of support, said yielding portion of the bushing section having a pair of projections the surfaces of which are adapted to abut against the surface of said cylindrical member, each of said projections being mounted on the yielding portion of the bushing section so as to assume the same inclination as that part of the yielding portion of the bushing section which carries it, said projections being positioned on said yielding portion of the bushing section so that the extreme end of each projection does not extend beyond the corresponding point of support and also being positioned on said yielding portion of the bushing section so that when said portion of the bushing section yields the surfaces of said projections are inclined in opposite directions.

7. A journal bearing comprising a rotary cylindrical member, a bearing bushing section supported at at least two points spaced apart in the direction of rotation of said rotary member to provide a yielding portion between the points of support, said yielding portion of the bushing section having a pair of projections the surfaces of which are adapted to abut against the surface of said cylindrical member, each of said projections being rigidly carried relative to said yielding portion of the bushing section and adapted to yield with said yielding portion and partake of its flexure so as to assume the same inclination as that part of the yielding portion of the bushing section which carries it and said projections being positioned on said yielding portion of the bushing section so that the extreme end of each projection does not extend beyond the corresponding point of support and also being positioned on said yielding portion of the bushing section so that when said portion yields the surfaces of said projections are inclined in opposite directions.

In testimony whereof, I affix my signature.

GERHARD FLINTERMANN.